US008437044B2

(12) United States Patent
Schulze-Hagenest et al.

(10) Patent No.: US 8,437,044 B2
(45) Date of Patent: May 7, 2013

(54) METHOD AND DEVICE FOR CONTROLLING DIFFERENTIAL GLOSS AND PRINT ITEM PRODUCED THEREBY

(75) Inventors: Detlef Schulze-Hagenest, Molfsee (DE); Arun Chowdry, Pittsford, NY (US); Dinesh Tyagi, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 956 days.

(21) Appl. No.: 11/909,359

(22) PCT Filed: Dec. 21, 2005

(86) PCT No.: PCT/EP2005/013784

§ 371 (c)(1), (2), (4) Date: Mar. 24, 2010

(87) PCT Pub. No.: WO2006/099897

PCT Pub. Date: Sep. 28, 2006

(65) Prior Publication Data

US 2010/0195160 A1 Aug. 5, 2010

(30) Foreign Application Priority Data

Mar. 22, 2005 (EP) .................................... 05006182
Mar. 22, 2005 (EP) .................................... 05006183
Mar. 22, 2005 (EP) .................................... 05006184

(51) Int. Cl.
*H04N 1/405* (2006.01)
*G06K 15/00* (2006.01)

(52) U.S. Cl.
USPC ........................................ 358/3.06; 358/3.09

(58) Field of Classification Search ....................... None
See application file for complete search history.

(56) References Cited

U.S. PATENT DOCUMENTS

| | | | |
|---|---|---|---|
| 4,210,346 | A | 7/1980 | Mowry, Jr. et al. |
| 5,506,671 | A | 4/1996 | Buts et al. |
| 5,534,904 | A | 7/1996 | Sheinman |
| 5,583,660 | A | 12/1996 | Rylander |
| 5,689,293 | A | 11/1997 | Hirano |
| 5,695,220 | A | 12/1997 | Phillips |
| 5,788,285 | A | 8/1998 | Wicker |
| 5,853,197 | A | 12/1998 | Mowry, Jr. et al. |
| 5,969,733 | A | 10/1999 | Sheinman |

(Continued)

FOREIGN PATENT DOCUMENTS

| | | |
|---|---|---|
| EP | 1367810 | 12/2003 |
| EP | 1541368 | 6/2005 |

*Primary Examiner* — Douglas Tran

(74) *Attorney, Agent, or Firm* — Donna P. Suchy; Peyton C. Watkins

(57) ABSTRACT

The invention describes a method to control differential gloss of halftone areas produced using substantially clear or low-pigmented toner. It is an objective of this invention to provide a method which allows to produce digital watermarks on paper without being limited in the gloss properties of the toner, the paper or and selected fusing technology. The present invention relates to a method producing clear, low density or highdensity watermarks using Glossmark technology using low-pigmented toner or clear toner. Glossmark technology is for controlling the differential gloss of an image using the steps selecting a first halftone image having a first anisotropic structure, selecting a second halftone image having a second structure different from that of the first halftone, applying the first halftone to at least some portion of the halftone image and applying the second halftone to another portion of the halftone image.

9 Claims, 1 Drawing Sheet

U.S. PATENT DOCUMENTS

Figure 1:
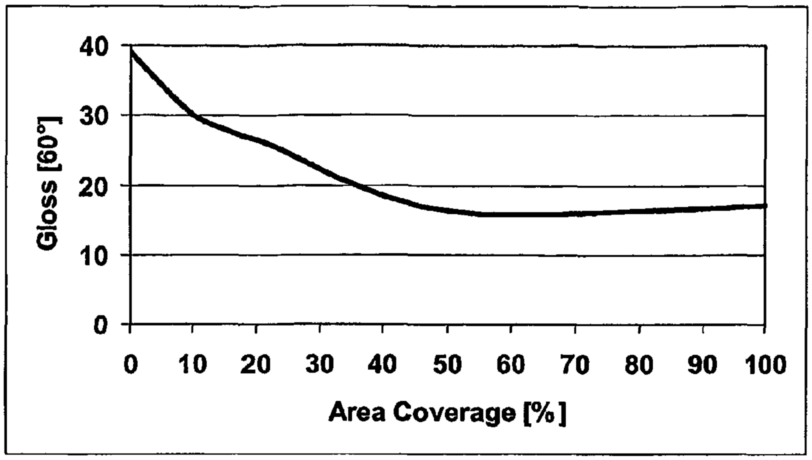

| | | | |
|---|---|---|---|
| 6,003,980 | A | 12/1999 | Sheinman et al. |
| 6,106,107 | A | 8/2000 | Sheinman |
| 6,108,512 | A | 8/2000 | Hanna |
| 2003/0231349 | A1 | 12/2003 | Wang et al. |
| 2004/0000786 | A1 | 1/2004 | Xu et al. |
| 2004/0001233 | A1 | 1/2004 | Wang et al. |
| 2004/0114160 | A1 | 6/2004 | Wang et al. |
| 2004/0156078 | A1 | 8/2004 | Wang et al. |
| 2006/0127117 | A1 * | 6/2006 | Eschbach et al. ............... 399/67 |
| 2008/0079971 | A1 * | 4/2008 | Liu et al. ........................ 358/1.9 |

* cited by examiner

METHOD AND DEVICE FOR CONTROLLING DIFFERENTIAL GLOSS AND PRINT ITEM PRODUCED THEREBY

The invention describes a method to control differential gloss of halftone areas. More specifically it describes a method to produce digital watermarks and gloss-mark by control of the print gloss when halftone images of substantially clear toner are printed on a substrate alone or together with low density or high-density halftone images.

It is desirable to protect a document against copying. This could be done in a manner that part of the content can be readily observed by a human reader but not by a copier or scanner. An image that is printed using clear toner or ink, creating a difference in reflected light and diffused light that can be distinguished by a human reader by looking the paper at an angle, but cannot be detected by a copier or scanner that is restricted to reading at right angles to the page.

Since some time clear or white toner is used to produce digital watermarks that cannot be copies or scanned but can be observed by a human reader.

U.S. Pat. No. 4,210,346 and U.S. Pat. No. 5,695,220 describes a method to achieve different diffused light characteristic at different angles using particular white paper and particulat white toner. This methods needs specific designed toners and papers.

U.S. Pat. No. 6,108,512 describes non-copyable prints printing text using clear toner. It can be detected by human eye due to the differential gloss but not with a conventional scanner. This method needs again specifically matched paper and toner having a large difference in gloss. It works in the combination glossy toner on matte paper and matte toner on glossy paper but not using e.g. glossy paper and toner in the same gloss range that is common in the field of digital commercial printing.

U.S. Pat. No. 5,788,285 describes a method and product for making non-reproducible documents, in which nearly invisible indicia on the document is printed. It consists of continuous screened lines of a desired pitch, and a background that will not reproduce by copying. It is formed by orthogonal reproduction of positive/negative images of continuous lines to produce broken lines of a desired width and pitch U.S. Pat. No. 5,853,197 describes a security document, which is provided comprising a substrate having a top surface for carrying indicia. The security term is composed of a pattern of security term elements. The background elements and/or the security term elements differ in element size, shape, angle, density, and/or frequency between adjacent areas.

U.S. Pat. No. 5,583,660 describes a screen comprises columns and rows of halftone dot centers in which there is equal spacing in row to row, column to column, and column to rows relationships, but the columns are not geometrically orthogonal (perpendicular) to the rows.

U.S. Pat. No. 5,506,671 describes an electrophotographic printing process for forming one or more colorless toner images in combination with at least one color toner image produced in an electrophotographic way on a receptor element.

US 20030231349, US20040000786 and US20040001233 describe a method to manipulate differential gloss of an image (picture or text) by selectively applying halftones with anisotropic structure characteristics that are significantly different in orientation while remaining identical in density (Glossmark). A gloss image is thus superimposed within an image without the need for special toners/inks or paper. The teaching of these documents is limited to color halftone images. It cannot be used for low-density images or image areas specifically below 50% more specifically below 30% or most specifically below 20% area density. It cannot be used as well for high-density images or image areas specifically above 60% more specifically above 70% or most specifically above 80% area density as the effect is too week in these cases to be detected by human eye.

All of the above are herein incorporated by reference in their entirety for their teaching.

It is an objective of this invention to provide a method which allows to produce digital watermarks on paper without the limitations described above that means without being limited in the gloss properties of the toner, the paper or and selected fusing technology.

The problem is solved by providing a method for controlling the differential gloss of an image using the steps selecting a first halftone image having a first anisotropic structure, selecting a second halftone image having a second structure different from that of the first halftone, applying the first halftone to at least some portion of the halftone image and applying the second halftone to another portion of the halftone image characterized in that a toner is used that is substantially colorless to realize the first and second halftone images.

The problem is solved as well by providing a method for controlling the differential gloss of in a low density image produced with pigmented toners using the steps selecting a first halftone image having a first anisotropic structure, selecting a second halftone having a second structure orientation different from that of the first halftone, applying the first halftone to at least some portion of the halftone image and applying the second halftone to another portion of the halftone image characterized in that substantially colorless toner is added to the pigmented toner structures so that the total area coverage of pigmented plus substantially unpigmented toners is in the range of 20% to 80%, more preferable in the range 30% to 70% and most preferable in the range 40 to 60%. Alternatively the concentration of pigment in the toner is reduced so that the total area coverage of the toner is in the range 30% to 70%. For this alternative solution all improvements and modifications are valid as well.

The problem is solved as well by providing a method for controlling the differential gloss of in a low density image produced with pigmented toners using the steps selecting a first halftone image having a first anisotropic structure, selecting a second halftone having a second structure orientation different from that of the first halftone, applying the first halftone to at least some portion of the halftone image and applying the second halftone to another portion of the halftone image characterized in that that substantially colorless toner is added to the pigmented toner structures so that the total area coverage of pigmented plus substantially unpigmented toners is >100%.

The present invention relates to a method producing clear watermarks, lowdensity watermarks and high-density watermarks using Glossmark technology and clear toner/ink. Glossmark technology is for controlling the differential gloss of an image using the steps selecting a first halftone image having a first anisotropic structure, selecting a second halftone image having a second structure different from that of the first halftone, applying the first halftone to at least some portion of the halftone image and applying the second halftone to another portion of the halftone image. The second structure maybe anisotropic as well.

The number of structures is not limited. In a specific embodiment two halftone structures are used. The second halftone maybe applied to the remaining part of the halftone image or to apart of it only. It may cover part of the print or the remaining part of the print area not covered by the first anisotropic structure. The first anisotropic structure and the second anisotropic structure orientation maybe 90 degrees apart.

Halftone in this context means screened structures of toner layers with a preferred area coverage of app. 20% to 80% or more preferable 30%-70% and most preferable in the range 40%-60%. This range they do exhibit anisotropic structures for solid areas and toner/ink-less areas. In areas with low (10%) or high (90%) area coverage the effect is not sufficient to be observable by human eye.

The present invention also relates to a process where the gloss of the paper and the gloss of the toner measured separately on 100% covered areas are to be about the same. In this cases the existing methods achieve differential gloss using clear toners without using anisotropic structures fail, as there no differential gloss is existing.

Low-density areas in this context mean areas with a area coverage too low to observe anisotropic structures by human eye. These are area coverage below the area coverage limits mentioned above especially area coverage of 30%, 20% or even 10%.

High-density areas in this context mean areas with an area coverage too high to observe anisotropic structures by human eye. These are area coverage above the area coverage limits mentioned above especially area coverage of 80%, 70% or even 60%.

The substantially clear toners in the present invention are essentially the same composition as color toners used in the art, except for the dyes and pigments. The clear toners are substantially transparent, such that the inherent colors of the applied color toners are not materially masked and the relative amount of reflected light from the image is essentially maintained and not materially diminished by the clear toner. The clear toner may be slightly tinted, pigmented or dyed up to a degree where it is substantially transparent uniformly over the visible spectrum (400 to 700 nm).

The method is particularly suitable for electrophotographic printers using dry toners as these toners having a median particle size in the range 5-10 μm, which, when fused may show a pregnant glossmark behavior.

In particular the present invention relates to a method to produce clear water-marks, low density or high-density watermarks where the structure of the second halftone has an anisotropic orientation as well.

This technology allows producing visible watermarks using toners that produce image of about the same gloss as the paper with the appropriate fusing technology.

In a specific embodiment the low pigmented toner specifically either low-pigmented cyan or low-pigmented toner is applied using the fifth print module of an electrophotographic printer equipped with 5 print modules. Five image units are installed along the paper pass and transfer their color separation to the paper either one after the other directly or via a blanket cylinder or jointly via a transfer belt.

The image units contain for example the different toners in the following order: black, yellow, dark magenta, dark cyan and light magenta, light cyan or light black (gray). The dark black, cyan and magenta image unit are equipped with a toner that results in a image density of 1.6 or more, the image unit equipped with light cyan or magenta toner or gray toner results in a image density of 1.0 or less preferably half of the image density achieved with dark cyan or magenta black toner. Low density yellow toner maybe used as well.

Both values relate to development of full area coverage, which means area coverage above app. 95% depending on the morphology of the substrate.

The mean particle size of the toner particles is 4-10 μm preferably 5-9 μm most preferably 6-8 μm.

The light cyan, light magenta and gray image stations in the fifth position can be easily exchanged including their toner hopper. The selection of the light toner in the fifth imaging unit is based on the image content and is either done by the operator or by the color separation software.

The area coverage of the anisotropic halftone images is enhanced using either low-pigmented cyan or low-pigmented magenta or low pigmented yellow toner or low pigmented black (gray) toner of similar gloss so that the total area coverage of the pigmented toner is in the range of 20% to 80% preferably in the range of 30% to 70% and most preferably in the range of 40% to 60%. Using low-pigmented toner the area coverage to achieve the same image density can be increased by the relation:

$$R=CN/CL$$

Where CN is the concentration of the pigment in the normal pigmented toner and CL is the concentration of the same pigment in the lower pigmented toner. The to reduction of image density at the same area coverage can be achieved as well by using pigments with lower tinting strength or by addition of other pigments that reduce the image density at the same area coverage. This maybe white or silver pigment or another light colored pigment (e.g. titanium oxide, zinc oxide, or Titanium strontium oxide).

The gray toners maybe low pigmented black toners with a low percentage of black pigment (typically 0.1%-2%)—preferably carbon black, magnetite or black non-magnetic composite particles comprising hematite or black iron oxide hydroxide particles as core particles optionally surface treated. If white or silver pigments are used as described before the black pigment concentration is in the range 0.2-5% and the white or silver pigments in the range 5% to 10%.

The visibility of an anisotropic impression of the human eye depends on the total coverage of toner/ink of the same gloss level on the paper independent of the pigmentation.

FIG. 1 shows the measured gloss level at an angle of 60°. A standard glossy paper is used showing a measured gloss of 39°. The gloss value at area coverage 0% is the paper gloss. The toner is a standard color toner fused to the paper using a standard hot roller fuser. The temperature of the hot roller was 160° C.

The paper speed when passing through the fuser was 30 cmls.

FIG. 1 shows that the gloss decreases with increasing area coverage. At 10% area coverage it reaches a value of 30. The gloss difference between paper and image gloss at 10% area coverage is 9 only. This difference is too small to observe a clear Glossmark effect with the human eye. Using low-pigmented toner or adding substantially clear toner enhances the gloss difference to paper and thus the visibility of the Glossmark effect. The measured gloss level decreases with increasing area coverage and reaches saturation at about 50%. If the area coverage is further increased the gloss level stays stable but the Glossmark effect decreases as the percentage of toner/ink covered paper decreases.

Figure 2:
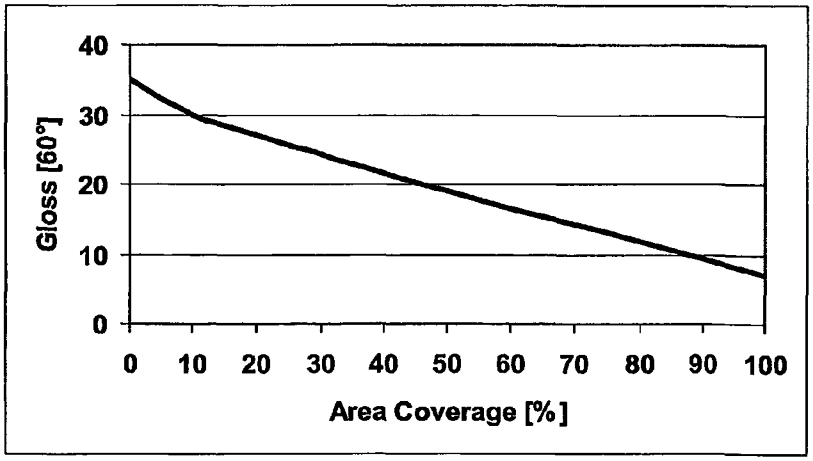

FIG. 2 shows the dependence of gloss measured at an angle of 60° on the area coverage for another toner/paper combination. A standard glossy paper is used showing a measured gloss of 35°. The gloss value at area coverage 0% is the paper gloss. The toner is a color toner for non-contact fusing fused to the paper using a non-contact fusing in this case microwave fusing.

FIG. 2 shows that the measured gloss level decreases and thus the gloss difference to the paper gloss increases with increasing area coverage. At 10% area coverage it reaches a value of 30. The gloss difference between paper and image gloss at 10% area coverage is 5 only. This difference is too small to observe a clear Glossmark effect with the human eye. Using low-pigmented toner or adding substantially clear toner enhances the gloss difference to paper and thus the visibility of the Glossmark effect. The measured gloss level decreases with increasing area coverage and reaches a value of 19 at 50% resulting in a gloss difference of 15 to the paper that is well detectable by the human eye. If the area coverage is further increased the gloss difference to the paper further increases but the Glossmark effect decreases again as the percentage of toner/ink covered paper decreases.

The invention claimed is:

1. A method for controlling the differential gloss of an image on a substrate, the method comprising:

selecting a first halftone having a first anisotropic structure, selecting a second halftone having a second structure different from that of the first halftone, applying the first anisotropic structure to at least some portion of the image and applying the second structure to another portion of the image wherein a toner that is substantially clear is used to generate the first and second halftones, and the gloss of the substrate and the toner measured separately on 100% covered areas is to be about the same, characterized in that there is no differential gloss existing between the substrate and the toner.

2. The method of claim 1, wherein the second structure has an anisotropic orientation.

3. The method of claim 2, wherein the image comprises area densities of 20% to 80%.

4. The method of claim 3 wherein the first anisotropic structure orientation and the second anisotropic structure orientation are 90 degrees apart

5. The method of claim 3 wherein the halftone image is intended for an electrophotographic printer.

6. The method of claim 3 wherein the second halftone is applied to the remaining portion of the halftone image.

7. A halftone image comprising: a first halftone having an anisotropic structure; and at least one additional halftone having a second structure different from the first halftone, wherein the first anisotropic structure is applied to a portion of the halftone image and the second structure is applied to another portion of the halftone image wherein a toner that is substantially clear is used to generate the first and second halftones, and that the gloss of a substrate and the toner measured separately on 100% covered areas is to be about the same, characterized that there is no differential gloss existing between the substrate and the toner.

8. A print item comprising: a substrate and a halftone image comprising: a first halftone having a first anisotropic structure; and at least one additional halftone having a second structure different from the first halftone, wherein the first anisotropic structure is applied to a portion of the halftone image and the second structure is applied to another portion of the halftone image wherein a toner that is substantially clear is used to generate the first and second halftones, and that the gloss of a substrate and the toner measured separately on 100% covered areas is to be about the same, characterized that there is no differential gloss existing between the substrate and the toner.

9. A device for producing a print item comprising: a substrate and a halftone image comprising: a first halftone having a first anisotropic structure orientation; and at least one additional halftone having a second structure different from the first halftone, wherein the first anisotropic is applied to a portion of the halftone image and the second structure is applied to another portion of the halftone image wherein a toner that is substantially clear is used to generate the first and second halftones, and that the gloss of the substrate and the toner measured separately on 100% covered areas is to be about the same, characterized that there is no differential gloss existing between the substrate and the toner.

* * * * *